United States Patent [19]

Kappei

[11] 3,876,086

[45] Apr. 8, 1975

[54] DEVICE FOR COUPLING A BATTERY CARRYING CAR TO BATTERY GUIDING MEANS PROVIDED IN THE CARRIAGE OF A BATTERY DRIVEN VEHICLE

[75] Inventor: Friedhelm Kappei, Sehnde, Germany

[73] Assignee: Daimler-Benz Aktiengesellschaft, Unterturkheim, Germany

[22] Filed: Dec. 22, 1972

[21] Appl. No.: 317,746

[30] Foreign Application Priority Data
Dec. 23, 1971 Germany............................ 483959

[52] U.S. Cl................................ 214/38 B; 104/34
[51] Int. Cl................................................ B65g 67/02
[58] Field of Search.......... 214/38 B, 38 BA, 38 BB, 214/38 D; 104/34

[56] References Cited
UNITED STATES PATENTS
384,562   6/1888   Condict ............................. 104/34
439,237   10/1890  Corning ............................. 104/34
2,820,642 1/1958   Harper ......................... 214/38 B X
2,964,894 12/1960  Culver......................... 214/38 B X

*Primary Examiner*—Robert G. Sheridan
*Attorney, Agent, or Firm*—Roland I. Griffin

[57] ABSTRACT

A pair of battery carrying cars and a battery driven vehicle, in which a battery is supported on a pair of transverse guide rails, are provided with alignment means for aligning the battery carrying cars with opposite ends of the guide rails of the battery driven vehicle and are further provided with locking means for locking the aligned battery carrying cars in place while the battery is transferred from the battery driven vehicle to one of the battery carrying cars and another battery is transferred from the other battery carrying car to the battery driven vehicle.

6 Claims, 5 Drawing Figures

DEVICE FOR COUPLING A BATTERY CARRYING CAR TO BATTERY GUIDING MEANS PROVIDED IN THE CARRIAGE OF A BATTERY DRIVEN VEHICLE

BACKGROUND AND SUMMARY OF THE INVENTION

This invention is related to a device for coupling a battery carrying car to battery guiding means provided in the carriage of a battery driven vehicle.

With battery driven vehicles it is periodically necessary to replace the so-called "traction battery" (belonging to the vehicle drive) by a battery just recharged, as the capacitance of such batteries is relatively small. Battery carrying cars are used to transport the relatively huge and heavy battery box. These battery carrying cars are laterally moved to the battery guiding means provided in the carriage of the battery driven vehicle so that the discharged battery may be moved onto a vacant battery carrying car and may be replaced from the opposite side by a new battery transported on another battery carrying car. Known devices have the disadvantage that it is especially difficult on uneven ground to adjust the battery carrying cars suitably to the battery guiding means provided in the carriage of the battery driven vehicle and to fix the battery carrying cars in this position during the exchange of the batteries.

It is the object of this invention to provide a device which permits the exchange of batteries without difficulty and without the danger of accidents. In accordance with this invention this object is achieved by employing at both ends of the battery carriage or the guide rails of the battery driven vehicle and at the battery carrying cars horizontally spaced alignment means that become engaged when the battery carrying cars are brought close to the ends of the guide rails and that align the battery carrying cars along the longitudinal axis of the guide rails of the battery driven vehicle, and by further employing locking means for locking the battery carrying cars and the battery driven vehicle in the aligned position to permit the exchange of the batteries.

Preferably, each of the horizontally spaced alignment means comprises a centering head provided at one end of the guide rails of the battery driven vehicle or, alternatively, at one of the battery carrying cars and a mounting means provided at the other of these alternative locations and having an outwardly widening opening for receiving the centering head. In order to obtain a rather simple and good centering effect the centering head and the mounting means have spherical contact surfaces.

The locking means comprises key bolts displaceably mounted at each of the battery carrying cars or, alternatively, at the guide rails of the battery driven vehicle for entry into key openings provided at the respectively opposing part. The key bolts of the locking means are coupled with a common tripping device and are displaceably mounted along a transverse axis of the mounting means. Furthermore, the key bolts may be spring loaded so that they automatically enter into the key openings when the battery carrying cars are in the correct position.

The inventive concept can be embodied in different manners. One embodiment is illustrated in the enclosed drawings.

DESCRIPTION OF THE PREFERRED EMBODIMENT

Figure 1:
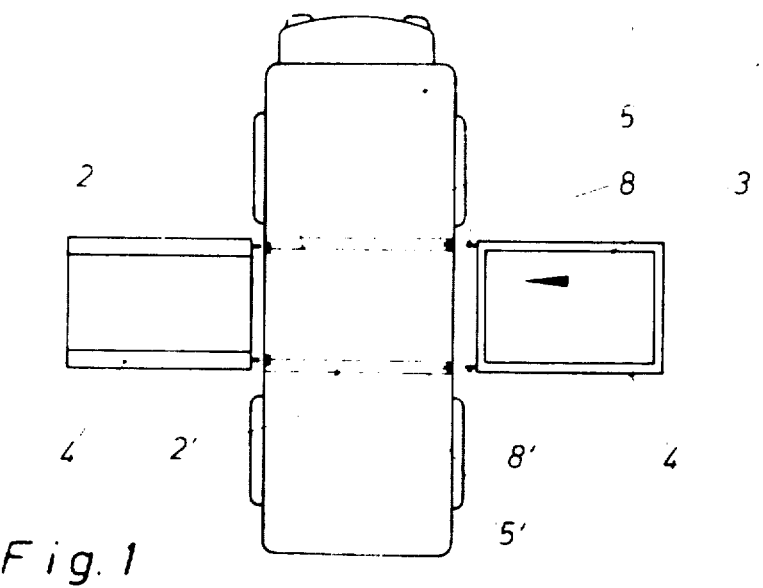
FIG. 1 is a schematic top view of a battery driven vehicle with battery carrying cars being laterally driven thereto during the battery exchange operation.

As shown in FIG. 1, the battery driven vehicle 1 has guiding rails 2 and 2' that pass approximately between the axles. Within these guiding rails the battery box 3 is supported. To transport the batteries, battery carrying cars 4 are used. These cars 4 are laterally moved to the vehicle 1. With each battery exchange operation two cars 4 are required, one car for providing the charged battery and a further car for receiving the discharged battery from the vehicle 1.

Figure 2:
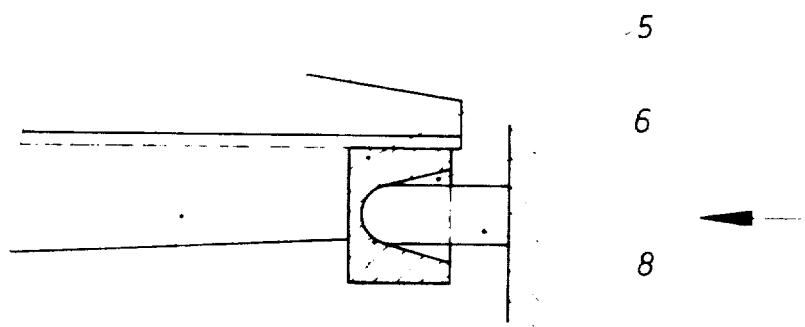
FIG. 2 is a vertical sectional view taken through one end of one of the battery guiding rails and the associated alignment means of FIG. 1.
Figure 3:
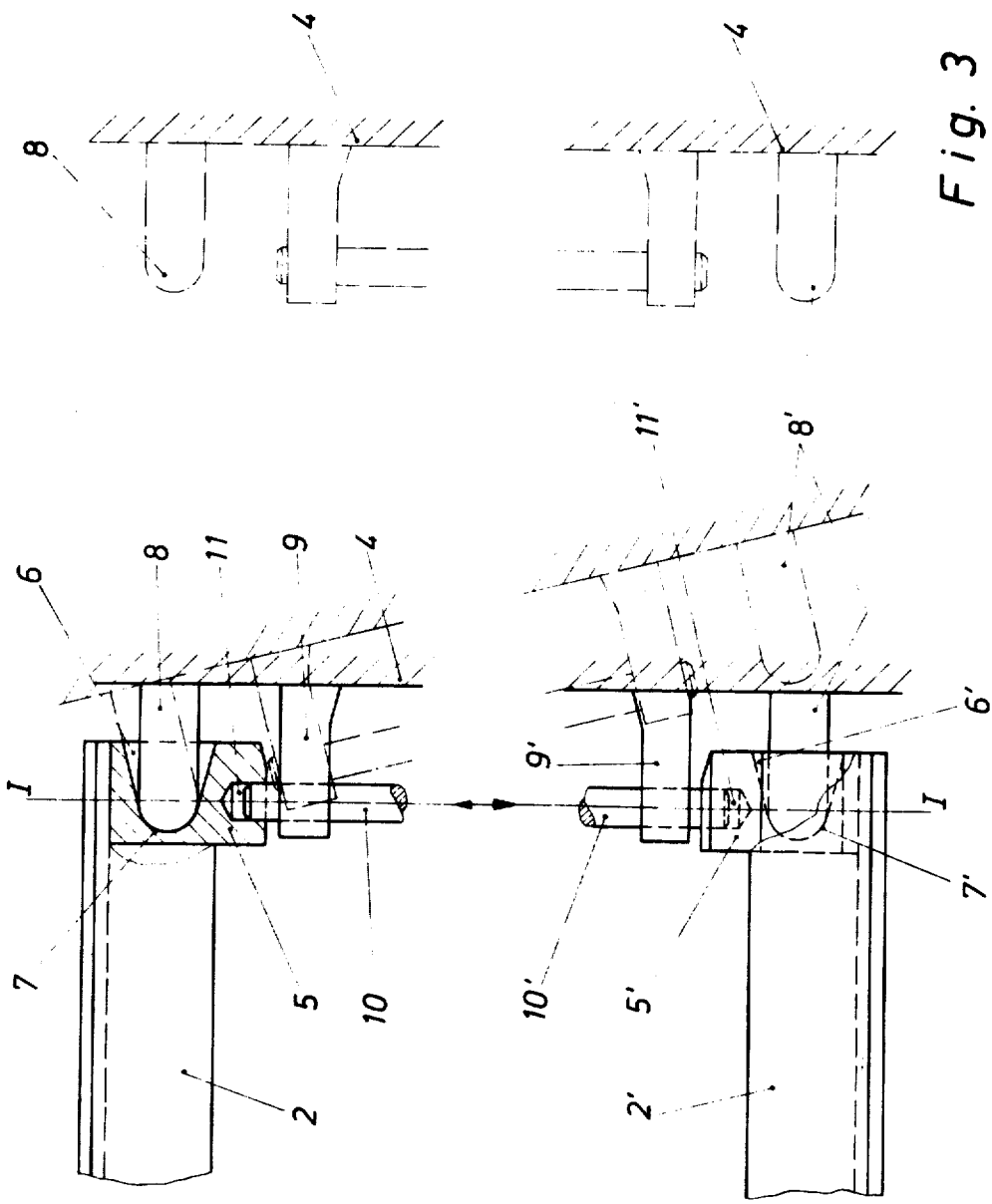
FIG. 3 is a horizontal plan view of one end of both of the battery guiding rails and the associated alignment means of FIG. 1.

In order to be able to suitably bring the battery carrying cars 4 up to the vehicle 1, even in the case of uneven ground, and to secure the cars 4 in the exchange position, mounting means 5 and 5' are provided at the ends of the battery guiding rails 2 and 2' in accordance with the invention, as shown in FIGS. 2 and 3. Each of these mounting means 5 and 5' comprises an outwardly widening opening 6 or 6' with a spherical bottom 7 or 7'. The spacing between these mounting means 5 and 5' corresponds to the horizontal distance between the guiding rails 2 and 2'. However, the mounting means 5 and 5' could also be provided at corresponding positions in the carriage of the vehicle 1.

At each battery carrying car 4 there are provided centering heads 8 and 8' spaced apart by a horizontal distance corresponding to the spacing of the mounting means 5 and 5'. These centering heads have spherical ends and are dimensioned such that they can be introduced without difficulty into the corresponding openings 6 and 6' of the mounting means 5 and 5'.

Figure 4:
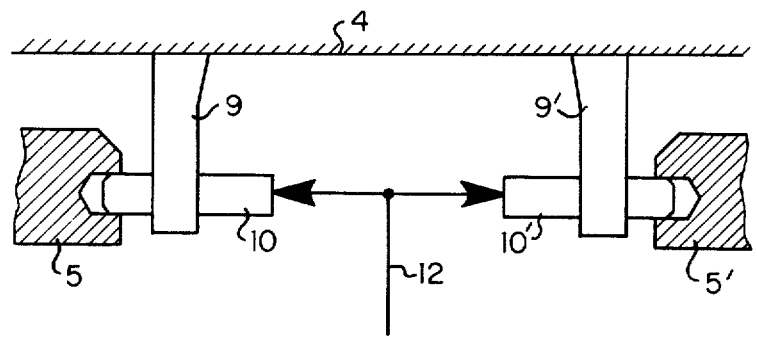
FIG. 4 is a schematic representation of the locking means of FIG. 3 with a common tripping means.
Figure 5:
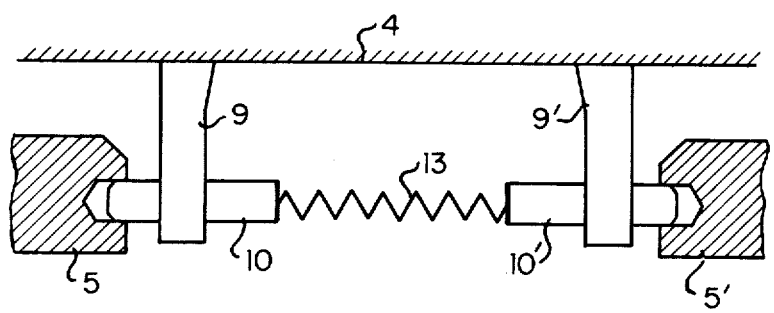
FIG. 5 is a schematic representation of the locking means of FIG. 3 with a loading spring.

When bringing each carrying car 4 close to the vehicle 1, it should be made sure that both centering heads 8 and 8' are suitably entered into both of the corresponding mounting means 5 and 5' to obtain the correct relative position of the car 4 and the guiding rails 2 and 2' of the vehicle 1. In this position locking of the car 4 to the guiding rails 2 and 2' is effected by means of key bolts 10 and 10' provided in mounting eyes 9 and 9' adjacent to the centering heads 8 and 8'. These key bolts enter into key openings 11 and 11' of the corresponding mounting means 5 and 5'. The key openings 11 and 11' are suitably located along axis I—I passing through the center of the spherical surfaces of the centering heads 8 and 8'. The key bolts 10 and 10' are provided with tripping means 12, as represented schematically in FIG. 4, or are spring loaded, as represented schematically in FIG. 5, so that the car 4 is automatically locked to the battery guiding rails 2 and 2' when the correct position is obtained.

As a matter of course the alignment and locking means could be constituted and located in different manners. It is especially possible to exchange the engaging components and, for example, to locate the mounting means 5 and 5' at the battery carrying cars 4 and the centering heads 8 and 8' with the key bolts 10 and 10' at the guiding rails 2 and 2' or in the carriage of the vehicle 1, respectively.

I claim:

1. Coupling apparatus for coupling a battery transport vehicle and a battery driven vehicle to permit transfer of a battery therebetween, said coupling apparatus including horizontally-spaced alignment means mounted on one of the vehicles for releasable engagement with corresponding horizontally-spaced alignment means of the other of the vehicles to align the battery transport vehicle along a longitudinal axis of a battery guiding means of the battery driven vehicle, and further including locking means displaceably mounted on said one of the vehicles for movement along a transverse axis laterally intersecting the longitudinal axis of the guiding means to releasably engage corresponding locking means of said other of the vehicles and lock the battery transport vehicle in alignment with the longitudinal axis of the guiding means of the battery driven vehicle, said locking means mounted on said one of the vehicles comprising horizontally-spaced key bolts displaceably mounted for movement along said transverse axis, and said locking means of said other of the vehicles comprising corresponding horizontally-spaced key openings for receiving the key bolts.

2. Coupling apparatus as in claim 1 wherein each of said horizontally-spaced alignment means mounted on said one of the vehicles comprises a centering head, and wherein each of said horizontally-spaced alignment means of said other of the vehicles comprises a mounting member having an outwardly widening opening for receiving a corresponding one of the centering heads.

3. Coupling apparatus as in claim 2 wherein each of said centering heads and each of said outwardly widening openings are provided with spherical contact surfaces.

4. Coupling apparatus as in claim 1 wherein said horizontally-spaced key bolts are coupled to a common tripping means.

5. Coupling apparatus as in claim 1 wherein said horizontally-spaced key bolts are spring loaded to automatically urge them into releasable locking engagement with the key openings.

6. Coupling apparatus as in claim 1 wherein said horizontally-spaced alignment means and said horizontally-spaced key bolts mounted on said one of the vehicles are mounted on the battery transport vehicle, wherein said longitudinal axis of the guiding means of the battery driven vehicle extends across the battery driven vehicle between a pair of axles thereof, and wherein said horizontally-spaced alignment means and said horizontally-spaced key openings of said other of the vehicles are mounted on the battery driven vehicle.

* * * * *